(12) United States Patent
Poley et al.

(10) Patent No.: US 7,162,407 B2
(45) Date of Patent: Jan. 9, 2007

(54) TESTING A HOST'S SUPPORT FOR PERIPHERAL DEVICES

(75) Inventors: Joshua G. Poley, Redmond, WA (US); Jeffrey M. Alexander, North Bend, WA (US)

(73) Assignee: MS1-Microsoft Corporation

( * ) Notice: Subject to any disclaimer, the term of this patent is extended or adjusted under 35 U.S.C. 154(b) by 794 days.

(21) Appl. No.: 10/007,056

(22) Filed: Dec. 3, 2001

(65) Prior Publication Data

US 2003/0105606 A1 Jun. 5, 2003

(51) Int. Cl.
*G06F 9/455* (2006.01)
(52) U.S. Cl. ...................................... 703/24
(58) Field of Classification Search .......... 703/24; 710/313
See application file for complete search history.

(56) References Cited

U.S. PATENT DOCUMENTS

| | | | | |
|---|---|---|---|---|
| 6,389,029 | B1 * | 5/2002 | McAlear | 370/402 |
| 6,393,588 | B1 * | 5/2002 | Hsu et al. | 714/43 |
| 6,468,160 | B1 | 10/2002 | Eliott | |
| 6,636,929 | B1 * | 10/2003 | Frantz et al. | 710/313 |
| 6,712,704 | B1 | 3/2004 | Eliott | |
| 6,721,332 | B1 * | 4/2004 | McAlear | 370/466 |
| 6,769,989 | B1 | 8/2004 | Smith et al. | |
| 2004/0162137 | A1 | 8/2004 | Eliott | |

OTHER PUBLICATIONS

IBM Technical Disclosure Bulletin, "Multiple Control Unit/Device Emulator for Testing Computer Programs", Sep. 1971, vol. 14, Issue 4, pp. 1212-1213.*

Universal Serial Bus, "Device Class Definition for Human Interface Devices (HID)", Version 1.11,Jun. 27, 2001.*

"Universal Serial Bus Specification", Revision 1.1, Sep. 23, 1998.*

McConnell, Steve; "Code Complete", 1993, Microsoft Press.*

Tanenbaum, Andrew S.; "Computer Networks", third edition, 1996, Pentice-Hall.*

Tanenbaum, Andrew S.; "Computer Networks", third edition, 1996, Prentice Hall, pp. 404-405.*

"LCS/Telegraphics Introduces Industry's First HID Device Simulator; Targets Universal Serial Bus Development Community", LCS USB Simulator Press Release, 1999-2000.

"USB Simulator", USB-Universal Serial Bus, Sep. 8, 1997, http://www.pointing.com/USB.HTM, 2pages.

"LSC USB Simulator Specification", LSC USB Simulator Specification, 1999-2000, http://pointing.com/USBSPEC.HTM, one page.

* cited by examiner

*Primary Examiner*—Paul Rodriguez
*Assistant Examiner*—Russ Guill
(74) *Attorney, Agent, or Firm*—Lee & Hayes, PLLC

(57) ABSTRACT

In order to test a host's support for peripherals that use a given type of peripheral interface, an interface device communicates with peripheral interface ports of the host. The interface device also communicates with an emulation computer over a local area network. The emulation computer is programmed to emulate one or more peripheral devices by receiving and responding to messages. The interface device passes messages between the host and the emulation computer, using a peripheral interface communications protocol for communications with the host and using a network communications protocol for communications with the emulation computer.

19 Claims, 4 Drawing Sheets

TESTING A HOST'S SUPPORT FOR PERIPHERAL DEVICES

TECHNICAL FIELD

This invention relates to the testing of computer-based or computer-like devices and more particularly to testing such devices' support for peripherals that communicate using a given communications protocol such as USB.

BACKGROUND

The "Universal Serial Bus" or "USB" is a standardized interconnection mechanism for connecting various types of peripherals to a computer or computer-like device. USB is perhaps most commonly thought of as a mechanism for connecting gaming peripherals such as joysticks or game controllers. However, USB is suitable for connecting many different types of peripherals to a computer, such as optical scanners, digital speakers, digital cameras, keyboards, display devices, microphones, printers, mice, and many other types of devices. The USB standard encompasses mechanical, electrical, and data format aspects involved in transferring data between a host and a plurality of peripherals.

Generally, the USB standard contemplates at least three different types of peripheral devices, referred to as Human Input Devices (HID), bulk devices, and isochronous devices. HID devices include devices that accept human input, such as keyboards, mice, joysticks, game controllers, etc. Bulk devices include mass storage devices such as hard disks, optical memory devices, and other devices that involve transferring relatively large amounts of data. Isochronous devices include speakers, microphones, and other devices with respect to which data is transferred in a time-dependent manner.

Because of the popularity of USB peripherals, it is highly desirable to provide USB support in new computer products. However, it can be a challenging task to adequately test the USB support of a new computer product in light of the many different types and makes of available USB peripherals. The task is complicated by the very flexibility of the USB bi-directional communications protocol, which allows for a nearly unlimited number of configuration and communications scenarios.

The technology described below provides a flexible way to test peripheral communications capability of a computer-like device that has been designed to support a universal peripheral connection mechanism such as USB.

SUMMARY

In order to test a host's support of peripheral devices that use a particular peripheral communications protocol, peripheral ports of the host are connected to corresponding ports of an interface device. The interface device receives peripheral messages from the in-test host using the peripheral communications protocol and then packages or embeds those messages in network packets or datagrams. The network packets are sent over network communications media to one or more peripheral emulators, which extract or unpackage the embedded peripheral messages. The peripheral emulators generate additional peripheral messages, which are embedded by the emulators in network packets or datagrams and sent over the network communications media back to the interface device. The interface device unpackages or extracts the embedded peripheral messages and sends them on to the in-test host using the peripheral communications protocol.

Thus, the interface device (a) receives peripheral messages from the host using the peripheral communications protocol and forwards such messages to the one or more peripheral emulators using a network communications protocol and (b) receives peripheral messages from the one or more peripheral emulators using the network communications protocol and forwards such messages to the in-test host using the peripheral communications protocol.

DETAILED DESCRIPTION

Figure 1:
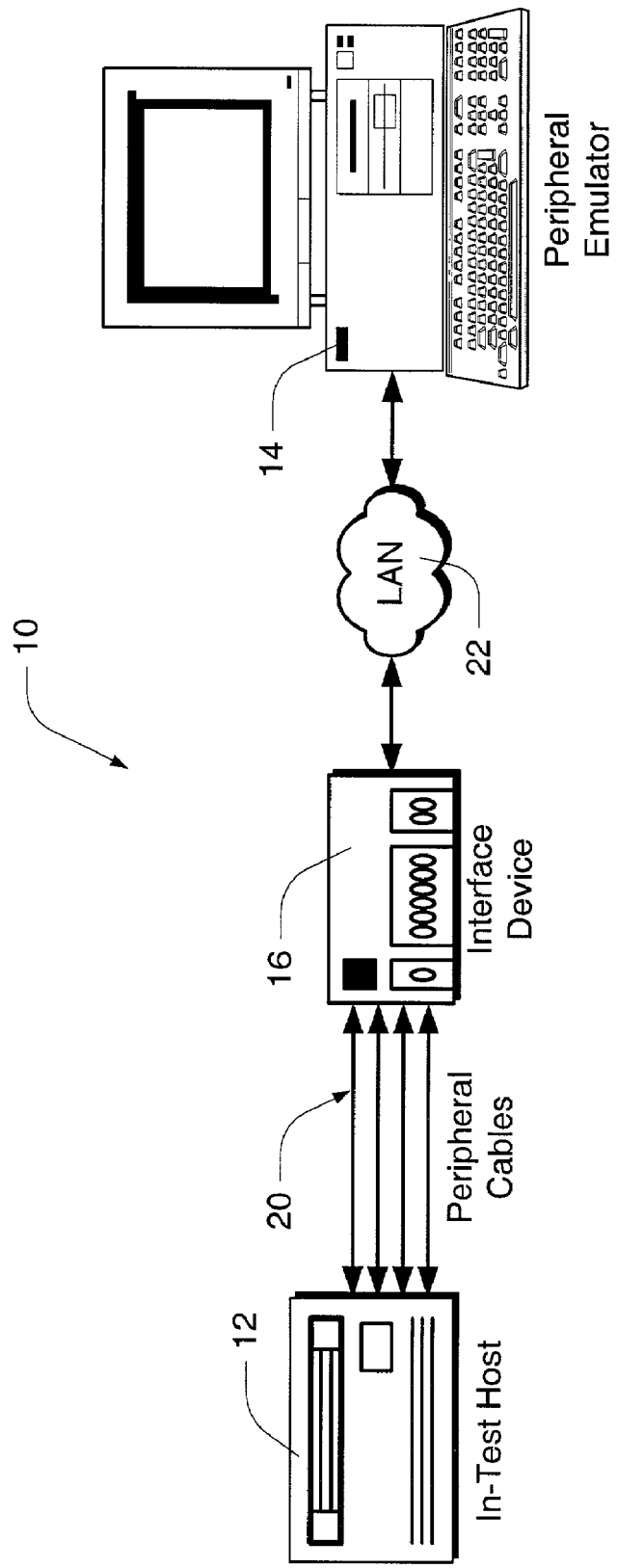
FIG. 1 illustrates a system for testing a host's support of peripheral devices.

FIG. 1 shows a test system 10 for testing an in-test host's support of peripherals that use a given peripheral communications protocol. In the exemplary embodiment described herein, the test system is designed to test support for USB peripherals. However, the system can alternatively be used to test support of other peripheral communications protocols.

The test system of FIG. 1 includes an in-test host 12. The in-test host in the exemplary embodiment is a gaming device being developed for use with a wide array of USB devices. In developing the host, various hardware and software components (such as drivers) are being designed to support USB devices, and the system of FIG. 1 is designed to exercise such hardware and software components in order to test their proper operation under various conditions.

In-test host 12 might comprise one of a large number of different types of computer-based or computer-like devices that operate in conjunction with various peripherals. Furthermore, although input devices such as joysticks, control pads, and such might be the most commonly used USB peripherals in the gaming environment, the test system is designed to support other types of devices as well. Specifically, the exemplary test system described herein is designed for compatibility with HID, bulk, and isochronous USB devices.

In-test host 12 sends and receives peripheral messages using a peripheral communications protocol, which in the described embodiment is the USB protocol. As already described, the USB protocol encompasses mechanical, electrical, and data formatting specifications. The in-test host has one or more USB ports that accept USB cables for communications with peripherals using the USB data transfer protocol.

Test system 10 further comprises one or more peripheral emulators 14 (only a single peripheral emulator is used in the illustrated embodiment). In this embodiment, the peripheral emulator 14 comprises a general-purpose computer. Emulator 14 is programmed to emulate various peripheral devices. In the USB environment, the emulator is programmed to emulate HID, bulk, and isochronous USB devices.

The use of a general-purpose computer allows concurrent emulation of a plurality of "virtual" peripherals. The peripherals are virtual in the sense that they do not necessarily correspond to actual or dedicated physical hardware as would normally be the case with many USB devices. It also allows testing to be conducted over a wide range of normal and abnormal conditions. Thus, emulator 14 can be programmed to emulate normally operating peripherals as well as peripherals that are operating abnormally, and to return normal or correct USB messages as well as USB messages that are abnormal in some sense. Furthermore, emulator 14 can be configured so that emulated devices provide the widest possible or foreseeable ranges of commands and parameters to the in-test host, and to generally simulate the most extreme expected conditions of peripheral usage. Furthermore, the emulator can be configured to emulate the connection and disconnection of peripheral devices.

Test system 10 further comprises an interface device 16. Generally, interface device 16 communicates peripheral messages with host 12 using one communications protocol, and with peripheral emulator 14 using a different protocol—a protocol that is not the same as the native protocol of the peripherals that are being emulated. More specifically, interface device 16 receives peripheral device messages from in-test host 12 using the native peripheral communications protocol (USB in the described embodiment) of the emulated peripheral devices and forwards such messages to peripheral emulator 14 using a network communications protocol (such as UDP/IP). In addition, interface device 16 receives peripheral device messages from peripheral emulator 14 using the network communications protocol and forwards such messages to in-test host 12 using the peripheral communications protocol. This process will be described in more detail below.

Interface Device

Figure 2:
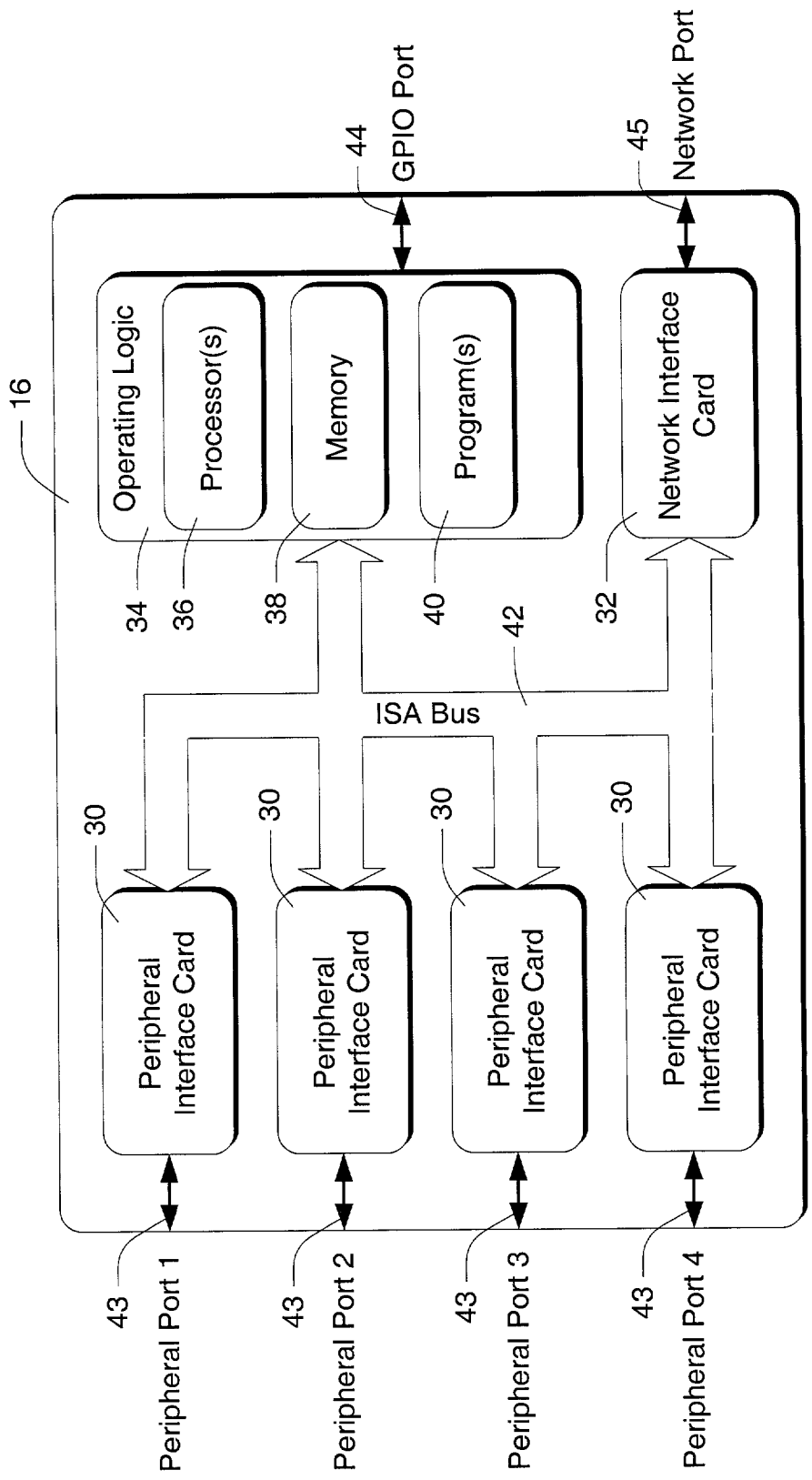
FIG. 2 shows pertinent details of an interface device such as used in the system of FIG. 1.

FIG. 2 shows pertinent logical components of interface device 16. Interface device 16 comprises a computer having a plurality of peripheral interfaces 30 and a network interface 32. Interface device 16 further comprises operating logic 34, which in the described embodiment comprises one or more processors 36, associated memory 38, and one or more programs 40 that are executed by the processor(s) to implement the functions of interface device 16.

In the described embodiment, the components of FIG. 2 are implemented in a bus-based system such as an ISA bus system. Each of peripheral interfaces 30 is a USB interface card that plugs into an ISA bus 42. Each card implements a physical USB interface or port 43 and is configured to communicate with a peripheral device port of the in-test host using the USB peripheral communications protocol. USB interface cards such as this are readily available.

The operating logic 34 is formed by a CPU or microcontroller card that similarly plugs into the ISA bus 42 and that incorporates a processor and memory. The CPU card is one of a number of available CPU cards that operate from a combination of volatile and non-volatile random-access memory. Typically, such cards operate under a relatively simple operating system such as MS-DOS. The particular card used in the described embodiment has a GPIO (general purpose I/O) port 44 through which the card can be configured. Specifically, one or more programs can be loaded into the non-volatile memory of the card and the card can be configured to automatically initiate such programs upon startup.

Network interface 32 is similarly a commercially-available ISA-based card, designed to support Ethernet network communications. It implements a single Ethernet port 45, and is configured to communicate with emulator 14 using a network communications protocol.

USB interfaces 30 of interface device 16 are connected by USB cables 20 (shown in FIG. 1) to communicate with one or more USB ports of in-test host 12 and to thereby communicate USB messages with in-test host 12. Interface device 16 is connected for communications with peripheral emulator 14 by Ethernet network communications media such as a typical, Ethernet-based, local area network (LAN) 22. Although the LAN shown in FIG. 1 includes only interface device 16 and peripheral emulator 14, it should be understood that the LAN might typically include a number of devices in addition to those shown. In other words, it is not necessary to create a dedicated LAN for purposes of test system 10. Rather, and existing corporate LAN can be utilized. Furthermore, any host computer of the LAN can potentially be used as emulator 14.

In the described embodiment, network communications between interface device 16 and emulator 14 are accomplished by way of UDP (user datagram protocol) over IP (Internet protocol), typically referred to as UDP/IP. This protocol transfers data between networked entities in the form of multiple packets or datagrams. Generally, each packet or datagram contains a header and a payload. The header indicates various parameters of the packet, such as its destination and size, while the payload consists of the actual data that is being transferred.

Note that although the described embodiment utilizes UDP/IP, there are various other network communications protocols that could also be used. TCP (transmission control protocol) over IP, typically referred to as TCP/IP, is an example of a suitable alternative network communications protocol.

Although USB systems utilize a command response protocol, where each bus has a single master that initiates all data transfers, other, non-USB systems may not utilize such a command/response protocol. Thus, non-USB peripherals might initiate messages, commands, or responses without receiving a previous command from a master. In order to differentiate between messages that are destined for the emulator 14 and those that are destined for in-test host 12, messages, packets, or data ultimately destined for emulator 14 (from left to right in FIG. 3) are referred to herein as "outgoing". Messages, packets, datagrams, or other data ultimately destined for in-test host 12 (from right to left in FIG. 3) are referred to as "incoming". This terminology is adopted strictly as a descriptive tool, and is not intended to imply any particular division of responsibility or order of communications between in-test controller 12 and emulator 14.

In general operation, the operating logic 34 of interface device 16 is configured to perform actions comprising:

Receiving outgoing peripheral device messages through peripheral interfaces 30 from in-test host 12 using a peripheral communications protocol.

Sending the received outgoing peripheral device messages through network interface 32 to peripheral emulator 14 using a network communications protocol.

Receiving incoming peripheral device messages through network interface 32 from peripheral emulator 14 using the network communications protocol.

Sending the received incoming peripheral device messages through peripheral interfaces 30 to in-test host 12 using the peripheral communications protocol.

Because the interface device has four peripheral interfaces 30, and because each interface corresponds to a single virtual device, peripheral messages can pertain to any one of the four different virtual devices. Received outgoing messages are distinguished based on the peripheral interface 30 that sends or receives them. On the LAN side of interface device 16, logical network ports are used to distinguish between messages pertaining to different emulated peripherals. Specifically, UDP/IP supports the use of "sockets", which can be considered logical ports for purposes of the description herein. Assuming that emulator 14 emulates four different devices, corresponding to the four peripheral interfaces 30 of interface device 16, four different socket designations are used for outgoing peripheral device messages destined for emulator 14. Four additional different socket designations are used for incoming peripheral device messages that originate with emulator 14. Thus, with respect to a particular outgoing peripheral device message designated for a particular one of the emulated peripheral devices (as indicated by the peripheral interface 30 that received it), interface device 16 sends that particular outgoing peripheral device message to a logical port or socket corresponding to that peripheral device. Similarly, when emulator 14 sends an incoming message from a particular emulated device, to be provided to in-test host 12 from a particular peripheral interface 30, the message is sent to a logical port or socket on interface device 16 corresponding to that peripheral device. In the described embodiment, UDP ports 201–204 are used for outgoing messages (received by emulator 14), and UDP ports 211–214 are used for incoming messages (sent from emulator 14). The operating logic of interface device 16 maintains a correspondence between logical ports and peripheral interfaces 30.

Generally, interface device 16 is designed and configured to simply pass command messages back and forth between in-test device 12 and emulator 14, without involvement in the actual data content of the messages. However, it may be desirable in certain situations for the interface device 16 to respond to messages from in-test device 12 without waiting from a response from emulator 14. In the described embodiment, for example, interface device 16 is configured to automatically return acknowledgement messages (ACKs) to in-test device 12 at appropriate intervals while waiting for a command response from emulator 14.

In addition, interface device 16 is configured to process USB checksums (CRCs) that form part of each USB message. Specifically, interface device 16 verifies the checksum of each USB command message received from in-test device 12 and adds checksums to USB response messages before sending them to in-test host 12.

Data Flow

Figure 3:
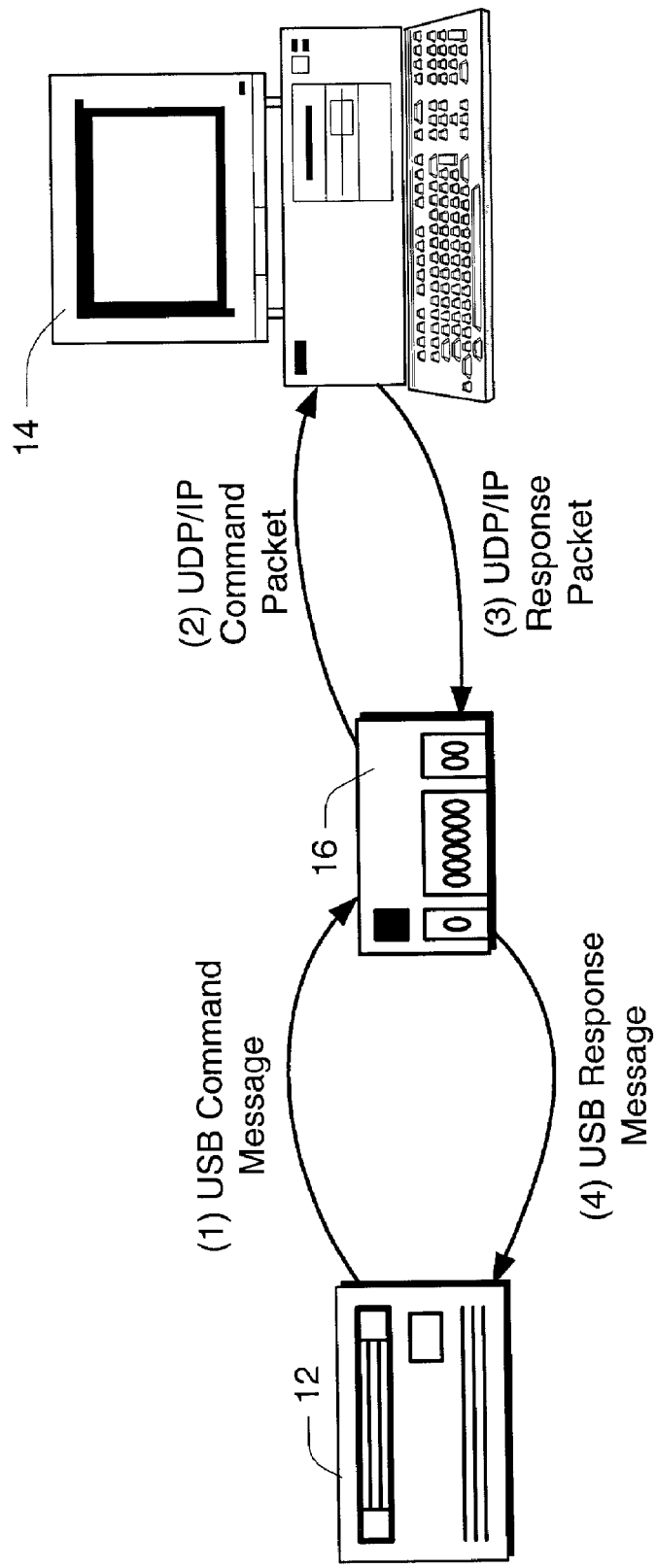
FIG. 3 illustrates data transfers that take place in the system of FIG. 1.

FIG. 3 illustrates data flow through interface device 16 in the specific context of a USB system. In the USB environment, in-test device 12 is assumed to be a bus master. Each of USB interface cards 30 is considered to be a single device. Communications are initiated by USB command messages issued from in-test device 12. Peripheral devices (emulated within peripheral controller 14) respond to commands with USB response messages. Thus, in a USB system, "command messages" are issued by in-test host 12 and are eventually destined for emulator 14. "Response messages" are issued by emulator 14 and are eventually destined for in-test host 12. The USB messages potentially include HID, bulk, and isochronous USB messages.

FIG. 3 shows a single transaction in which in-test host 12 generates a USB command message and peripheral emulator 14 generates a response message. The sequence involves four data transfers, labeled as follows in FIG. 3: (1) USB Command Message; (2) UDP/IP Command Packet; (3) UDP/IP Response Packet; and (4) USB Response Message. The transfers take place in the order listed. Operating logic 34 is configured to perform these transfers. More specifically, one or more of programs 40 comprise instructions that are executed by processor(s) 36 to perform these transfers.

(1) USB Command Message. A USB command message is initially sent or transmitted by in-test host 12 to a USB interface card of interface device 16 over the USB communications media (a USB cable). The command message is formatted in accordance with the USB standard. The USB command message is received from in-test host 12 by interface device 16 through one of its interface cards 30.

(2) UDP/IP Command Packet. Interface device 16 packages or embeds the received command message within the payload of a corresponding data packet formatted in accordance with a network communications protocol—within a UDP/IP packet or datagram. Interface device 16 then sends or transmits the UDP/IP packet (containing the embedded USB command message) to emulator 14 via LAN 22, using the UDP/IP network communications protocol. Emulator 14 receives the UDP/IP packet and its embedded USB command message from interface device 16 and unpackages or extracts the embedded USB command message.

(3) UDP/IP Response Packet. An emulated or virtual device within emulator 14 receives the extracted USB command message and formulates an appropriate USB response message in accordance with emulated device characteristics and desired test scenarios. The response message is initially formatted in accordance with the USB protocol, and is then embedded or packaged within a UDP/IP packet or datagram. The emulator then sends the UDP/IP packet or datagram, containing the USB response message, back over LAN 22 to interface device 16 using the UDP/IP network communications protocol. Interface device 16 receives the UDP/IP response packet and its embedded USB response message and unpackages or extracts the embedded USB response message.

(4) USB Response Message. The extracted USB response message is then sent or transmitted through one of USB interfaces 30 over the USB bus or cable to in-test host 12, using the USB communications protocol. In-test host 12 receives the USB response as if it is from an actual, physical device.

Peripheral Emulator

Figure 4:
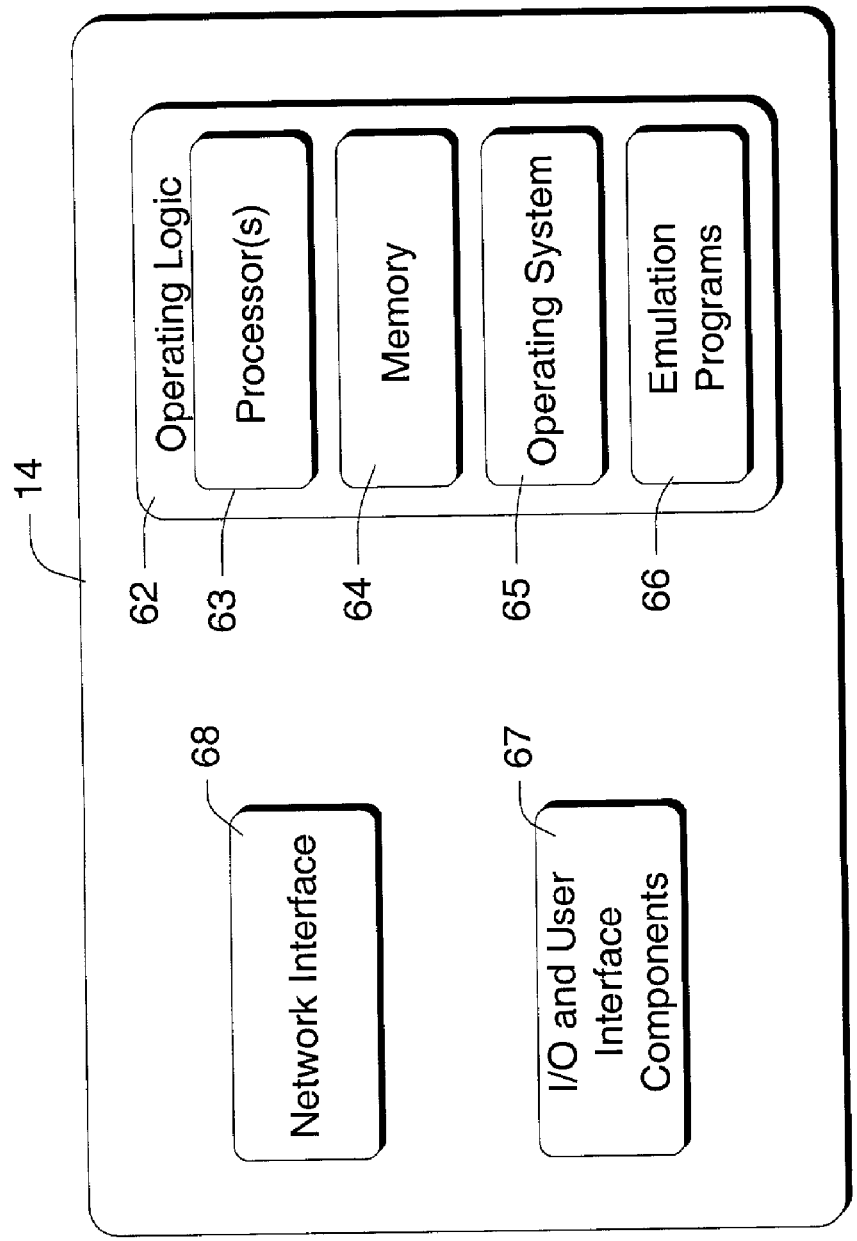
FIG. 4 shows pertinent details of a peripheral emulator such as used in the system of FIG. 1.

FIG. 4 shows pertinent components of general purpose computer 14, which is used as a peripheral emulator to emulate one or more peripheral components. Generally, various different general purpose or special purpose computing system configurations can be used for emulator 14, including but not limited to personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The functionality of computer 14 is implemented largely by means of computer-executable instructions, such as program modules, that are executed by the computer. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer such as magnetic-based hard disks. At execution, they are loaded at least partially into the computer's primary electronic memory. The invention described herein includes these and other various types of computer-readable media when such media contain instructions, programs, and/or modules for implementing the actions described below in conjunction with a microprocessor or other data processors. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With specific reference to FIG. 4, computer 14 has operating logic 62 that comprises one or more processors 63, memory 64, and one or more programs. The pertinent programs in this example comprise an operating system 65 and emulation programs 66. Computer 14 also includes various I/O and user interface components 67 such as a keyboard, visual display, etc. that are not specifically shown in FIG. 4.

Computer 14 further comprises a network interface 68 for communications with LAN 22 and interface device 16 (FIG. 2). In this example, the computer is configured to communicate with interface device 16 and potentially with other networked components using a network communications protocol such as IP. Specifically, UDP/IP is used to communicate with interface device 16. Although the example described herein utilizes Ethernet network communications media, other forms of network communications media and protocols might alternatively be used.

Generally, emulation programs 66 are designed to respond to peripheral command messages received from interface device 16 and to create response messages that exercise the functionality of in-test host 12. More specifically, the emulation programs might comprise four different emulation programs, each corresponding to a different emulated or virtual USB device. Each such emulation program receives network data packets designating a particular respective logical port or socket, such as UDP sockets 201–204 as mentioned above. The network data packets have embedded USB command messages. Each emulation program responds to the embedded USB command messages by creating USB response messages which are in turn embedded in network data packets and sent back to interface device 16 using corresponding logical ports or sockets, such as UDP sockets 211–214 as mentioned above.

More specifically, the emulation programs are configured to perform actions comprising:
  Receiving data packets over a network communications media, wherein the data packets are formatted in accordance with a non-USB network communications protocol such as UDP/IP (with embedded USB command messages);
  Unpackaging USB command messages from the received data packets;
  Emulating one or more USB peripherals that respond to and create USB messages in order to create USB response messages;
  Packaging the USB response messages in data packets formatted in accordance with the non-USB network communications protocol; and
  Sending the data packets over the network communications media using the non-USB network communications protocol.

Interface Device/Emulator Data Format

Data communications between interface device 16 and emulator 14 are formatted in accordance with the UDP/IP communications protocol. Each data packet contains a payload formatted in a manner that allows for efficient packaging and unpackaging of USB data. Although the particular format of the payload will vary from one embodiment to another, the embodiment described herein uses the following fields within each UDP/IP payload transferred between interface device 16 and emulator 14:
  Message Type: a two byte code indicating a message type and an optional sub-type.
  USB Endpoint: a one byte value indicating with which USB endpoint the message is associated.
  Data Size: a two-byte value indicating the size of a data block that follows.
  Data: a field of variable length as indicated by the "Data Size" field.

The most frequently used message type is one in which the "Data" field contains USB data for transfer between in-test device 12 and emulator 14. Another type of UDP/IP message is defined for handshaking messages such as ACKs and NAKs between interface device 16 and emulator 14.

As described above, each UDP/IP data packet is directed to or received from a logical port or socket that corresponds to a particular one of peripheral interfaces 30, each of which represents a physical device. The USB protocol includes the concept of "endpoints" within each physical device. The "USB Endpoint" field is used in USB data transfers to indicate which endpoint the data is associated with. Note that this field is ignored in messages that are not associated with a particular endpoint.

Other UDP/IP message types apply to status and configuration messages between interface device 16 and emulator 14. These types allow emulator 14 to query interface device 16 for status information, version information, logical address information, etc. In addition, these message types allow emulator 14 to set various parameters within interface device 16. For example, in the USB environment each of the USB peripheral interfaces 30 might have settings that are desirably set by emulator 14 depending on the nature of the USB device that is being emulated. As another example, it might be desirable to allow emulator 14 to set the USB address of each interface 30. Furthermore, these message types might allow emulator 14 to perform functions such as instructing a peripheral interface 30 to connect to or disconnect from in-test device 12, or to instruct interface device 16 to reset itself.

For messages not associated with a particular peripheral interface 30, interface device 16 listens on UDP socket 200. Furthermore, interface device 16 responds to UDP broadcast messages on UDP socket 200. This capability allows peripheral emulator 14 to detect the presence and IP address of interface device 16 on LAN 22.

Conclusion

Although details of specific implementations and embodiments are described above, such details are intended to satisfy statutory disclosure obligations rather than to limit the scope of the following claims. Thus, the invention as defined by the claims is not limited to the specific features described is above. Rather, the invention is claimed in any of its forms or modifications that fall within the proper scope of the appended claims, appropriately interpreted in accordance with the doctrine of equivalents.

The invention claimed is:

1. A testing interface device for testing an in-test host's support of USB peripherals, the testing interface device comprising:
   USB interfaces configured to communicate with one or more USB ports of the in-test host to communicate USB messages with the in-test host;
   a network interface configured to communicate with a peripheral emulator using a network communications protocol which supports logical network ports, the peripheral emulator configured to emulate USB peripheral devices;
   operating logic configured to perform actions comprising:
      receiving USB command messages sent from the in-test host to the testing interface device;
      sending the USB command messages from the testing interface device to the peripheral emulator through the network interface using the network communications protocol;
      receiving USB response messages sent from the peripheral emulator to the testing interface device through the network interface using the network communications protocol;
      sending the received USB response messages from the testing interface device through the USB interfaces to the in-test host to determine whether the in-test host supports proper operation of the emulated USB devices; and
      maintaining a correspondence between the emulated USB peripheral devices and the logical network ports of the testing interface device, such that upon receiving a USB command message from the in-test host using a USB protocol and corresponding to a particular emulated USB peripheral device, the testing interface device sends the USB command message to the peripheral emulator via one of the logical network ports which corresponds to the particular emulated USB device, and such that when receiving a USB response message from the peripheral emulator using the network communications protocol and corresponding to the particular emulated USB peripheral device, the testing interface device receives the USB response message via the logical network port which corresponds to the particular emulated USB device.

2. A testing interface device as recited in claim 1, further comprising the peripheral emulator, wherein the peripheral emulator is programmed to emulate one or more USB peripherals.

3. A testing interface device as recited in claim 1, further comprising the peripheral emulator, wherein the peripheral emulator is programmed to emulate HID, bulk, and isochronous USB peripherals.

4. A testing interface device as recited in claim 1, further comprising the peripheral emulator, wherein the peripheral emulator comprises a general-purpose computer programmed to emulate one or more USB peripherals.

5. A testing interface device as recited in claim 1, further comprising the peripheral emulator, wherein the peripheral emulator comprises a general-purpose computer programmed to emulate HID, bulk, and isochronous USB peripherals.

6. A testing interface device as recited in claim 1, further comprising the peripheral emulator, wherein:
   the peripheral emulator comprises a general-purpose computer;
   the general-purpose computer is programmed to emulate one or more USB peripherals; and
   the general-purpose computer is further programmed to generate USB response messages that test the in-test host with ranges of USB peripheral parameters.

7. A testing interface device as recited in claim 1, further comprising the peripheral emulator, wherein:
   the peripheral emulator comprises a general-purpose computer;
   the general-purpose computer is programmed to emulate one or more USB peripherals; and
   the general-purpose computer is further programmed to generate abnormal USB response messages in order to test the in-test host with such abnormal USB response messages.

8. A testing interface device as recited in claim 1, wherein:
   the operating logic is further configured to automatically send acknowledgment messages from the testing interface device to the in-test host while waiting to receive the USB response messages from the peripheral emulator.

9. A testing interface device as recited in claim 1, wherein the USB interfaces comprise at least four USB interfaces.

10. A testing interface device as recited in claim 1, wherein the USB messages comprise HID, bulk, and isochronous USB messages.

11. A testing interface device as recited in claim 1, wherein the network interface comprises an Ethernet interface.

12. A testing interface device as recited in claim 1, wherein the network communications protocol comprises an Ethernet communications protocol.

13. A testing interface device as recited in claim 1, wherein the network communications protocol comprises an IP protocol.

14. A testing interface device as recited in claim 1, wherein the network communications protocol comprises UDP over IP.

15. A method of testing an in-test host's support of USB peripherals, comprising:
   sending USB command messages from an in-test host to a testing interface device which supports logical network ports;
   receiving the USB command messages from the in-test host at the testing interface device;
   packaging the USB command messages in command data packets formatted in accordance with a network communications protocol;
   sending the command data packets via the logical network ports of the testing interface device to a peripheral emulator over network communications media;
   unpackaging the USB command messages from the command data packets at the peripheral emulator;
   emulating one or more USB peripheral devices that respond to the USB command messages which have been unpackaged by generating USB response messages;
   packaging the USB response messages in response data packets at the peripheral emulator, such that the response data packets can be sent from the peripheral emulator to the testing interface device using the network communications protocol;

receiving the response data packets from the peripheral emulator over the network communications media at the testing interface device via the logical network ports, wherein the response data packets are formatted in accordance with a network communications protocol;

unpackaging USB response messages from the response data packets at the testing interface device;

sending the USB response messages which have been unpackaged from the testing interface device to the in-test host;

receiving the USB response messages at the in-test host;

determining whether the in-test host supports proper operation of the emulated USB devices based on the USB response messages; and maintaining a correspondence between the emulated USB peripheral devices and the logical network ports of the testing interface device, such that upon receiving a USB command message from the in-test host using a USB protocol and corresponding to a particular emulated USB peripheral device, the testing interface device sends the USB command message to the peripheral emulator via one of the logical network ports which corresponds to the particular emulated USB device, and such that when receiving a USB response message from the peripheral emulator using the network communications protocol and corresponding to the particular emulated USB peripheral device, the testing interface device receives the USB response message via the logical network port which corresponds to the particular emulated USB device.

16. A method as recited in claim 15, further comprising emulating one or more abnormal USB peripherals that respond to the USB command messages which have been unpackaged, by generating abnormal USB response messages and packaging the abnormal USB response messages in response data packets in order to test the in-test host's ability to handle such abnormal USB response messages.

17. A method as recited in claim 15, wherein the network communications protocol comprises an Ethernet communications protocol.

18. A method as recited in claim 15, wherein the network communications protocol comprises an IP protocol.

19. A method as recited in claim 15, wherein the network communications protocol comprises UDP over IP.

* * * * *